Oct. 3, 1961     J. L. DECKER     3,002,714
AIRCRAFT LONGITUDINAL CONTROL SYSTEM
Filed Jan. 13, 1958     3 Sheets-Sheet 1
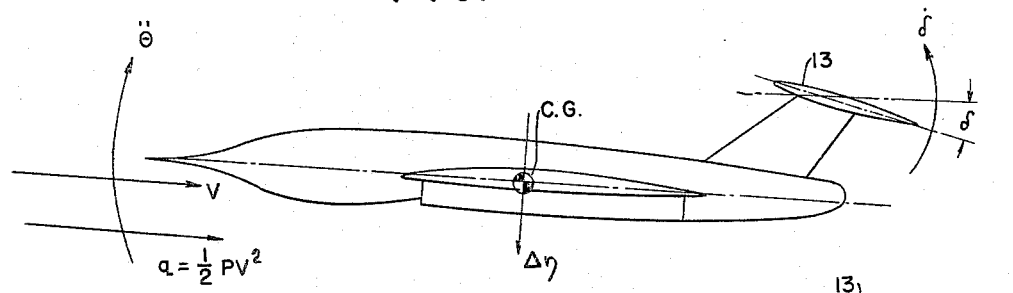
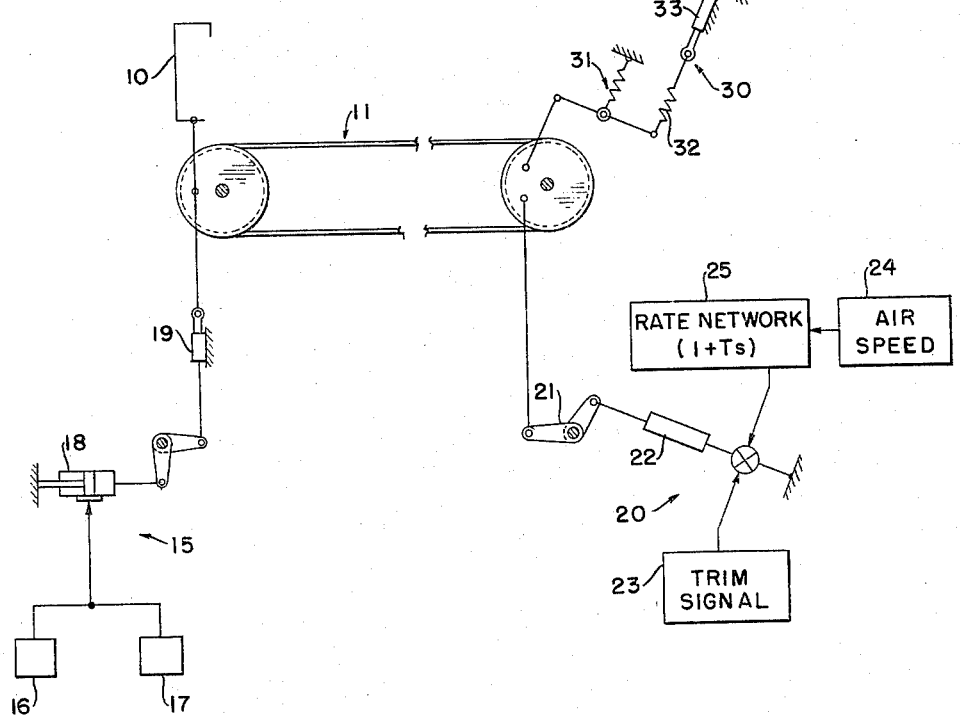
INVENTOR.
JAMES L. DECKER
BY Julian C. Renfro
ATTORNEY

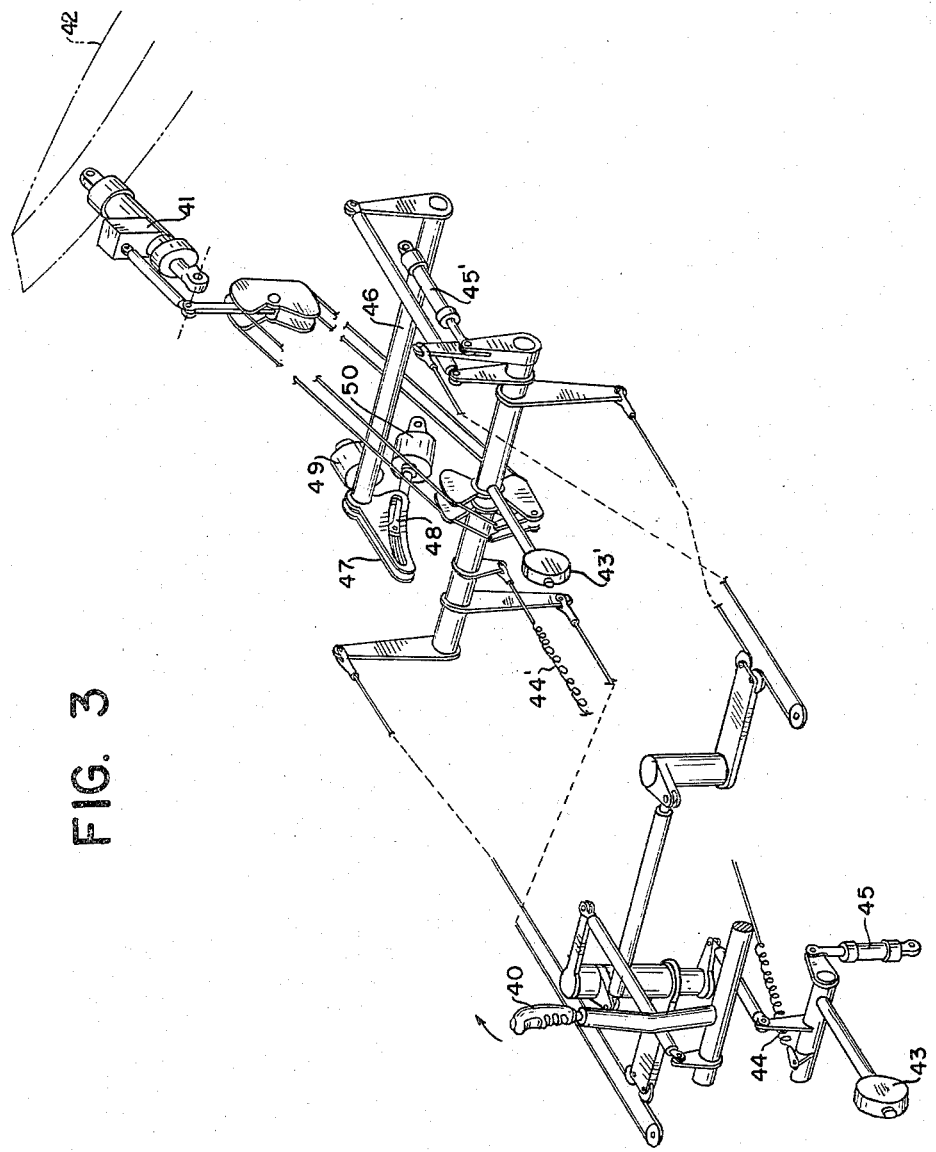

Oct. 3, 1961 J. L. DECKER 3,002,714
AIRCRAFT LONGITUDINAL CONTROL SYSTEM
Filed Jan. 13, 1958 3 Sheets-Sheet 3

INVENTOR.
JAMES L. DECKER
BY Julian C. Renfro
ATTORNEY

United States Patent Office 3,002,714
Patented Oct. 3, 1961

3,002,714
AIRCRAFT LONGITUDINAL CONTROL SYSTEM
James L. Decker, Towson, Md., assignor to The Martin Company, a corporation of Maryland
Filed Jan. 13, 1958, Ser. No. 708,600
12 Claims. (Cl. 244—83)

The present invention relates to a longitudinal control system for aircraft or the like, and more particularly to a method and apparatus for providing therewithin a synthetic "feel" force indicative of aircraft behavior to the aircraft controls.

The longitudinal control system of an aircraft is employed normally to regulate aircraft pitch by deflecting the horizontal tail surfaces of the aircraft. Larger high-speed aircraft, for example, ordinarily employ servo devices within the longitudinal control system to provide the power required to deflect the flight control elements in response to the pilot's manipulation of the aircraft controls. In such a powered system the pilot is dependent upon synthetic force cues generated within the control system and applied to the aircraft controls to provide a "feel" as to the behavior of the aircraft. Conventionally, such synthetic force cues are proportional to control surface deflection. However, this is not entirely sufficient in some cases, particularly when the aircraft is subject to compressibility effects or loading changes.

It has been determined that a pilot uses the control force characteristics almost exclusively in controlling an airplane and relies only to a very small extent upon control motion. He associates a given level of control force with the load factor the aircraft develops and the speed change from the trim speed. It is this general concept that is being referred to by the term force cues.

An air vehicle longitudinal control system according to this invention provides a means of developing pitching moments in response to the pilot command to alter the vehicle attitude and/or velocity. In fulfilling this function it is most important that the hardware design result in a stable man-machine operation. This latter requirement implies the provision of certain desirable control force changes or feel characteristics consistent with the vehicle response to the pilot action. This invention must not, however, be confused with an autopilot, which is a servo mechanism whose purpose it is to maintain vehicle attitude or velocity at a predetermined value while at the same time providing stabilization to the air vehicle. It should be noted that an autopilot will tend to counteract any disturbing changes, even those changes supplied by the pilot in an attempt to override the autopilot.

Accordingly it is one of the objects of the present invention to provide a longitudinal control system in which the force cues are substantially independent of control surface deflection but are responsive to actual flight behavior so that the synthetic "feel" force applied to the aircraft controls reflects the actual operation of the aircraft.

To this end the present invention provides a method and apparatus employing force cues which are a function of selected aircraft dynamics. In accordance with the invention the most important of these dynamics are (1) pitch angular acceleration of the aircraft ($\ddot{\theta}$), (2) change in load factor from 1 g, or normal acceleration of the aircraft ($\Delta N$), and (3) change in the speed of the aircraft from a preselected trim speed, preferably defined in terms of the ratio $$\frac{q - q_t}{q_t}$$

where:

$q$ = the dynamic air pressure of the aircraft, and
$q_t$ = the dynamic air pressure of the aircraft at a preselected trim speed.

The force cues derived from $\ddot{\theta}$ and $\Delta N$ are then applied to the aircraft controls in a direction tending to maintain the aircraft in level flight. The force cue derived from $$\frac{q - q_t}{q_t}$$

is applied to the aircraft controls in a direction tending to maintain the aircraft at the preselected trim speed. The resultant of these force cues as applied to the aircraft controls thus produces a synthetic "feel" force which is effectively indicative of aircraft behavior.

In a broader sense the force cues are a function of the short and long period pitch response of the aircraft where the short period is represented by $\ddot{\theta}$ and $\Delta N$, and the long period is represented by the change in air speed from trim. Other aircraft dynamics which are advantageously employed for greater accuracy are (4) stabilizer deflection from neutral ($\delta$), (5) rate of stabilizer deflection ($\dot{\delta}$), and (6) longitudinal acceleration of the aircraft ($\dot{u}$).

In the case of a piloted aircraft the synthetic force is applied to the pilot's control stick in order to provide him with a "feel" for the behavior of the aircraft and its response to his control manipulations. The present control system may also be readily utilized in pilotless aircraft. In that case the force cues are applied directly to the crank arm of the aircraft control element rather than to the pilot's control lever.

The longitudinal control system of the invention provides artificial stability for an aircraft that does not possess inherent stability, or augments the stability of a marginally stable aircraft. In addition, the control system is insensitive to changes in aircraft weight, center of gravity location, and non-linear aerodynamics such as pitch-up and tuck-under. Pitch-up is an aerodynamic phenomena which occurs at higher angles of attack in flight and involves an increasing nose up pitching moment accompanying increased angle of attack. Pitch-up is in effect a static longitudinal instability and may occur on aircraft which are adequately stable at low angles of attack. Tuck-under is another aerodynamic phenomena, and it involves a nose down pitching moment accompanying increased speed, with the angle of attack being held approximately constant. The nose down pitching moment will of course tend to increase speed, leading to further nose down moments. Tuck-under is normally associated with flight at transonic speeds. Thus the improved control system provides synthetic force cues which are effectively representative of aircraft behavior and response.

For a better understanding of the invention reference should be made to the following detailed description and accompanying drawing in which:

FIG. 1 is a schematic representation of an aircraft in flight indicating the aircraft dynamics employed by the longitudinal control system of the invention;

FIG. 2 is a simplified schematic representation of an aircraft longitudinal control system in accordance with the invention;

FIG. 3 is a perspective representation of an alternative aircraft longitudinal control system in accordance with the invention.

Figure 4:
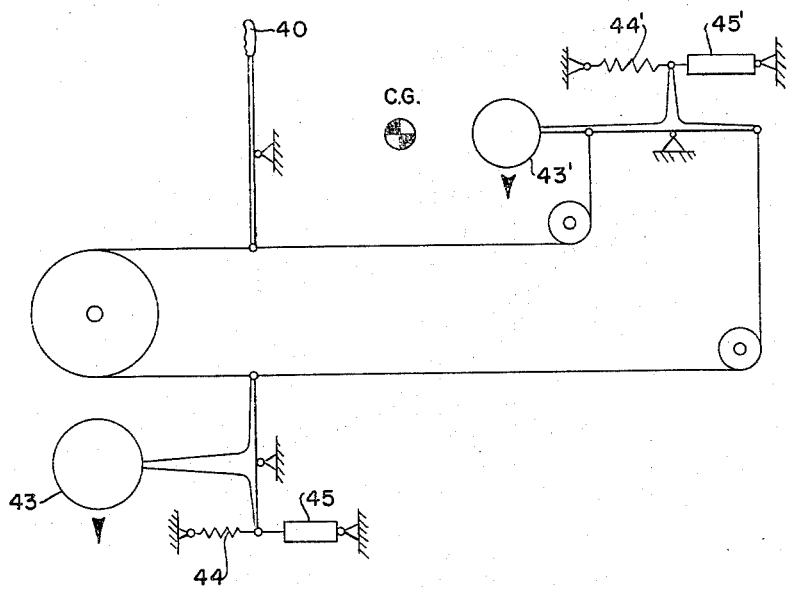
FIGS. 4 and 5 are simplified schematic representations of the mechanical network employed to produce force cues proportional to $\ddot{\theta}$ and $\Delta N$ in the control system of FIG. 3.

FIG. 1 schematically illustrates a high-speed jet aircraft and the selected aircraft dynamics employed by the invention to which the aircraft is subject in flight. Reference to FIG. 1 should be made throughout the following description for a better understanding of the nature of the force cues relevant to the invention.

The longitudinal control system in FIG. 2 is designed for use in a piloted aircraft. The invention may, however, be also employed in pilotless aircraft as heretofore indicated and, in fact, may be incorporated in the control system of controllable movable objects of various types.

The conventional elements of the longitudinal control system include a stick 10 which imparts control signals through a cable system 11 and hydraulic boost cylinder 12 to a horizontal stabilizer 13 (see FIG. 1) which acts as the longitudinal control element of the aircraft. To this conventional system are added a plurality of networks adapted to feed back to the control stick 10 force cues which are a function of the aircraft dynamics specified by the invention. The first of these networks 15 produces force cues which are proportional to the pitch angular acceleration of the aircraft ($\ddot{\theta}$), and to the change in load factor from 1 g or normal acceleration of the aircraft ($\Delta N$). The normal acceleration is also experienced by the pilot as pressing him down in his seat or lifting him away from it.

The network 15 employs a linear accelerometer 16 and a pitch accelerometer 17 to provide force cues proportional to $\ddot{\theta}$ and $\Delta N$. An accelerometer which may be advantageously employed for this purpose is described in the application of Conrad H. Cooke and Thomas C. Hill entitled "Inertial Control System for Aircraft," Serial No. 618,320, filed October 25, 1956, and assigned to the assignee of the present invention. The force cues produced by the accelerometers 16 and 17 are applied through a linkage system including loader cylinder 18, and the cable system 11 to the control stick 10. A damping element 19 is advantageously employed in the linkage system to minimize oscillation. The linkage system is adapted to apply the force cues to the control stick in a direction opposite to that initiating the change in aircraft dynamics so as to tend to maintain the aircraft in level flight. Mechanical network 15 therefore acts to provide short period stability to the aircraft.

The force cue proportional to $\ddot{\theta}$ provides advance warning of impending structural loads during rapid build up thereby giving the pilot an opportunity to correct control motions. The pilot may thus feel when a limit load factor is being approached as in a pull out. If only steady state maneuvers were to be performed (N essentially constant), this force would provide the pilot with sufficient warning of structural loads. In transient type maneuvers, however (N varying rapidly), limit load can be attained before the pilot is given sufficient warning. This is due to a lag in the response of the air frame in pitch to a relatively rapid input motion on the control stick and control surfaces. The pilot should therefore be given advance warning so that he may maintain the proper phase relationship between stick motion and air frame response. The $\ddot{\theta}$ term serves as an "anticipation" factor in this sense. Upon entry into a rapid maneuver the pilot feels in the stick a force cue proportional to $\ddot{\theta}$ which warns him to adjust the controls before the maneuver becomes too violent for the design structure limitations of the aircraft.

A second mechanical network 20 is employed to provide a force cue which is the function of a change in speed V of the aircraft from a preselected trim speed. In this embodiment the mechanical network 20 comprises a light-centering spring preferably a torsion spring 21. An electrical screw jack 22 is connected to this spring so as to index the spring in proportion to the value of an electrical input signal. The spring is then indexed in proportion to the preselected trim speed by introducing an electrical signal to the screw jack through trim control 23. The trim control normally includes a switch located on the pilot's stick 10 whereby the pilot may select a desired trim speed. Thereafter the spring 21 is continuously re-indexed in proportion to changes in the aircraft speed from the preselected trim speed. This is effected by means of circuit 24 which is adapted to produce an electrical signal proportional to air speed and connected to apply this signal to the screw jack 22. The force cue thus produced is applied through a linkage system including cable 11 to the control stick 10. The linkage system is adapted to apply this force cue to the control stick in a direction tending to maintain the aircraft at the preselected trim speed. Thus network 20 provides long period (phugoid) or static stability to the system.

Preferably the force produced by this network is provided in proportion to the terms:

$$\frac{q-q_t}{q_t}$$

where:

$q=$the dynamic air pressure$=\frac{1}{2}\rho V^2$ (refer to FIG. 1), and $q_t=$the dynamic air pressure at the selected trim condition.

Advantageously $q$ is taken to be compressible rather than incompressible. A conventional pitot tube may be employed to determine variations in $q$. The sense of the force cue is now applied through the linkage system such as to restore $q_t$, that is to say when $q>q_t$, the sign of $$\frac{q-q_t}{q_t}$$

is positive and the stick force is aft tending to reduce $q$. The reverse is true when $q<q_t$.

Thus during a trim flight condition, and assuming $\eta=1$ g and stick force$=0$, a speed change with its corresponding $q$ change will produce a restoring force in the control stick proportional to $$\frac{q-q_t}{q_t}$$

The ratio $$\frac{q-q_t}{q_t}$$

has further advantage in that trim adjustment is sensitive to low speeds and relatively insensitive at high speeds, permitting the pilot to trim at higher speeds without danger of overshooting.

The network as above described provides static stability to the aircraft but does not provide for a divergent phugoid, or one which is lightly damped. Such divergent phugoid may be damped by introducing a force to the control stick which is proportional to the rate of change of aircraft speed. One way to introduce such a force is by means of a simple rate network 25 connected between the air speed sensor 24 and the electric screw jack 22. The rate network is adapted to produce an output signal which is proportional to the rate of change of an input quantity, in this case speed. Thus the screw jack additionally indexes the spring 21 in proportion to the rate of change of the aircraft speed.

It will be noted that a third mechanical network 30 may be introduced between the cable system 11 and the hydraulic boost cylinder 12. This network provides a pitch damping effect and may therefore be advantageously employed to provide servo stability to the complete closed loop. The mechanical network 30 is a lag network and consists of a spring-mounted rotating link 31 which drives the stabilizer boost cylinder 12 through another spring 32 attached to a damping element 33 on the cylinder push rod. When this network is employed, there is no requirement for the usual pitch damper employed in conventional aircraft control systems.

Thus it will be seen that the mechanical networks according to this invention may involve a series of springs and dampers suitably interconnected to provide a predetermined dynamic response. These spring and damper networks are similar to resistance-capacitor networks utilized in electric circuits.

FIG. 3 illustrates in perspective form an alternative embodiment of the response type "feel" system of the invention. In this system the synthetic "feel" force applied to the control stick 40 is equal to a resultant of force cues as defined by the equation:

$$F_f = K_1\ddot{\theta} + K_2\Delta N + K_3\frac{q-q_t}{q_t} + K_4\dot{\delta} + K_5\delta$$

where:

$\ddot{\theta}$, $\Delta N$, and $\frac{q-q_t}{q_t}$ are defined as above, $\dot{\delta}$ = the rate of longitudinal control element deflection. (A force proportional to $K_4\dot{\delta}$ is transmitted to the control stick. This force is in part dependent upon, or representative of, control surface damping. It serves to restrict excessively rapid movements of the controls which would otherwise be possible with a low-inertia and fully-powered feel system, and at the same time acts as a damper to minimize oscillation of the controls), $\delta$ = the deflection of the aircraft longitudinal control element from neutral. (The trim neutral position varies with other conditions of flight. As indicated by the equation a force equal to $K_5\delta$ is transmitted to the control stick. This force is very nearly proportional to stick travel since there is a true relationship between stick and stabilizer surface position), $K_1$, $K_2$, etc. are constants selected in accordance with air frame characteristics to optimize handling qualities. The following figures are examples of the value assigned to these constants in a particular experimental application of the present invention.

$K_1$ = 42 pounds/radian/sec.$^2$
$K_2$ = 12 pounds/g
$K_3$ = 100 pounds/radian/sec.
$K_4$ = 4 pounds/degree stabilizer deflection $K_5$ = 50 pounds $\frac{\Delta q}{q}$ Among the signals that a "feel" system should provide are (1) indications of structural loads, (2) advance warning of impending excessive structural loads during rapid build-up so that the pilot can correct control motions, (3) assistance in maintaining dynamic stability of the aircraft (aside from stability augmentation otherwise provided for), and (4) means for avoiding pitch-up.

Signals numbers (1) and (2) are provided by the $\Delta N$ and $\ddot{\theta}$ terms respectively as indicated in the description with reference to FIG. 2. Signals numbers (3) and (4) are the result of the total effect of the force cues represented in the above equation. This is because all five force cues act to restore the aircraft to stick-free level flight. The action of the "feel" system is therefore somewhat like that of a low-gain autopilot.

The conventional portion of the control system of FIG. 3 comprises a cable system connecting the control stick 40 through a stabilizer-actuator cylinder 41 to the stabilizer 42. To this is added a first mechanical network by which the $\ddot{\theta}$ and $\Delta N$ terms are sensed and converted into force cues applied to the control stick. This alternative embodiment comprises a pair of pivotally mounted bob weights 43, 43' arranged on opposite sides of the aircraft center of gravity and coupled into the conventional control system. Each bob weight is maintained in a substantially horizontal position by springs 44, 44'. Advantageously the weights are counterbalanced at 1 g by springs arranged to be effectively rateless. Each bob weight is also equipped with a damping element 45, 45' to prevent undue oscillation.

Figure 5:
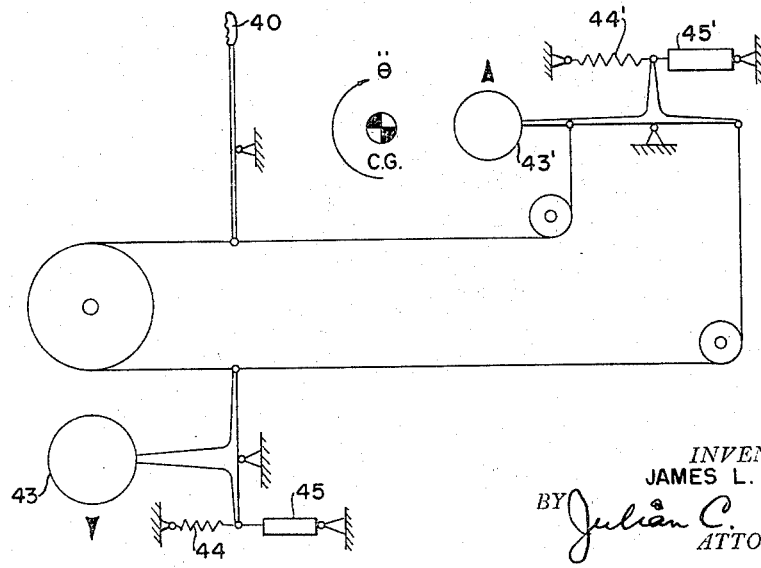

With this network normal or pitch acceleration of the aircraft causes rotation of each bob weight. As illustrated by the arrowheads in FIG. 4 the bob weights are linked to the control stick so that the forces caused by rotation of the bob weights due to normal acceleration oppose one another. This produces the force cue $K_2\Delta N$ at the control stick. On the other hand as illustrated by the arrowheads in FIG. 5 the bob weights are linked to the control stick so that the forces caused by rotation of the bob weights due to rotational acceleration ($\ddot{\theta}$) are additive. This produces the force cue $K_1\ddot{\theta}$ at the control stick.

The force cue equal to the $K_4\dot{\delta}$ term is provided in this system by the damping elements 45, 45'. These damping elements may be hydraulic cylinders in which case they may also be used for input cylinders for the conventional autopilot employed in the aircraft.

The force cue equal to $K_5\delta$ is provided by coupling into the control system a two-directional spring torque-tube 46, the wind up of which is proportional to stick travel.

The same spring torque-tube 46 affords a means for applying the $$\frac{q-q_t}{q_t}$$

component of the feel force to the control stick 40. To this end an arm 47 bearing a curved cam groove is attached to what would ordinarily be the fixed end of the torque-tube 46. A pivot block 48 is adapted to slide within this cam groove, the position of the block along the groove being controlled by a linear actuator 49 mounted at one end of the arm. This actuator is controlled by feedback from a central data computer (not shown) which senses the value of $q$ by means of an external pitot head. In this way the position of the pivot block 48 along the cam groove is proportional to $q$. In addition, the torque-tube end is axially pivoted and a second linear actuator 50 is adapted to connect the pivot block 48 to a fixed stationary reference. This second actuator is controlled by the pilot's trim switch and varies the position of the pivot block 48 with reference to the cam groove as a function of the trim input or $q_t$.

Thus movement of the pivot block 48 relative to the cam groove as a result of the actuation of either or both of the actuators 49 or 50 results in the angular motion of the torque-tube about its axis. The effect of such angular motion is to change the stick force at any fixed position thereof, or to alter the neutral point to which the stick returns when free, in proportion to $$\frac{q-q_t}{q_t}$$

By properly designing the cam groove the torque-tube may be adapted to maintain a desired ratio of stick force to $$\frac{q-q_t}{q_t}$$

To prevent excessive stick forces due to run-away trim, run-away $q$, or failure of the pilot to re-trim, mechanical stops and limit switches are advantageously included to restrict the angular travel of the controlling arm 47. One special advantage of this torque-tube system is that the desired ratio of trim travel to time for varying $q$ is assured because the radius about which the actuator 50 has to operate increases with $q$, and the actuator travel rate is constant.

By employing the aircraft response the response type feel system of this invention minimizes many of the disadvantages of the feel systems heretofore employed. For example, the improved feel system minimizes the variation of stick force per g with changes in center of gravity location, gross weight, and/or power settings. In addition, fluctuations in control forces associated with varying airplane stability during maneuvers are avoided, and in the transonic region, forces due to non-linear aerodynamics (e.g., tuck-up and tuck-under) are reflected in stick forces. Finally the stick forces supplied by the response-feel system are constantly such as to provide stick-free static stability, since the direction of the force is always to return the aircraft to the level flight condition for which it is trimmed out. Thus the improved response-feel system of the invention is a source of stability augmentation as well as information to the pilot.

A preferred embodiment of the invention has been described. Various changes and modifications may be made in the scope of the invention as set forth in the appended claims.

I claim:

1. In an aircraft longitudinal control system providing a synthetic "feel" force indicative of aircraft behavior to the aircraft controls, the combination of a first mechanical network having accelerometer means for producing a first force cue proportional to the pitch angular acceleration of said aircraft, and a second force cue proportional to acceleration of said aircraft normal to the longitudinal axis of said aircraft, with a first linkage system mechanically connected to apply said first and second force cues directly to said aircraft longitudinal control system in a direction tending to maintain the said aircraft in level flight, a second mechanical network adapted to produce a third force cue proportional to the change in speed of said aircraft from a preselected trim speed, with a second linkage system connected to apply said third force cue to said aircraft controls in a direction tending to maintain the said aircraft at the said preselected trim speed, and a trim control element connected to said second mechanical network and adapted to vary the value of said preselected trim speed, whereby the resultant of said first, second, and third force cues as applied to said aircraft controls, produces said synthetic "feel" force effectively indicative of aircraft behavior.

2. An aircraft longitudinal control system in accordance with claim 1 in which said first linkage system includes an oscillation damping element.

3. In an aircraft longitudinal control system providing a synthetic "feel" force indicative of aircraft behavior to the aircraft controls, the combination of a first mechanical network having means for producing a first force cue proportional to the pitch angular acceleration of said aircraft, and a second force cue proportional to the acceleration of said aircraft normal to the longitudinal axis of said aircraft, with a first linkage system connected to apply said first and second force cues to said aircraft longitudinal control system in a direction tending to maintain the said aircraft in level flight, and a second mechanical network adapted to produce a third force cue proportional to the change in speed of said aircraft from a preselected trim speed, with a second linkage system connected to apply said third force cue to said aircraft controls in a direction tending to maintain the said aircraft at the said preselected trim speed, whereby the resultant of said first, second, and third force cues as applied to said aircraft controls, produces said synthetic "feel" force effectively indicative of aircraft behavior, said second mechanical network comprising, a centering spring, an electrical screw jack connected and adapted to index said centering spring in proportion to the value of an electrical input signal, an electrical trim control adapted to produce an output signal proportionate to selected trim speed, circuit means connecting the output signal of said trim control to the input of said screw jack to index the said centering spring in proportion to the said selected trim speed, an electrical speed sensing element adapted to produce an output signal proportionate to the speed of the said aircraft, and circuit means connecting the output signal of said speed sensing element to the input of said screw jack to reindex the said centering spring in proportion to the departure of the speed of said aircraft from the said preselected trim speed.

4. An aircraft longitudinal control system in accordance with claim 3 which further comprises, an electrical rate network adapted to produce from an input signal quantity an output signal proportionate to the rate of change of said quantity, circuit means connecting the output signal of said speed sensing element to the input of said electrical rate network to produce at its output a signal proportionate to the rate of change of the speed of the said aircraft, and circuit means for connecting the output signal of said electrical rate network to the input of said screw jack to reindex the position of the said centering spring in proportion to the rate of change of the speed of said aircraft.

5. In an aircraft longitudinal control system providing a synthetic "feel" force indicative of aircraft behavior to the aircraft controls, the combination of, a mechanical network having means for producing a first force cue proportional to the pitch angular acceleration of said aircraft, and a second force cue proportional to acceleration of said aircraft normal to the longitudinal axis of said aircraft, with a linkage system connected to apply said first and second force cues to said aircraft controls in a direction tending to maintain the said aircraft in level flight, and a mechanical network adapted to produce a third force cue proportional to the change in speed of said aircraft from a preselected trim speed, and a fourth force cue proportional to the rate of change of the speed of said aircraft, with a linkage system connected to apply said third and fourth force cues to said aircraft controls in a direction tending to maintain the said aircraft at the said preselected trim speed, whereby the resultant of said first, second, third, and fourth force cues as applied to said aircraft controls, produces said synthetic "feel" force effectively indicative of aircraft behavior.

6. In an aircraft control system for a longitudinal control element and providing a synthetic "feel" force indicative of aircraft behavior to the aircraft controls, the combination of, a pair of pivotally mounted bob weights positioned on opposite sides of the center of gravity of the said aircraft, and a spring system adapted to maintain each said bob weight in a substantially horizontal neutral position, whereby normal or pitch angular acceleration of the said aircraft causes spring-restrained rotation of each said bob weight, with a linkage system connecting said bob weights to the said aircraft controls, said linkage system being adapted to apply to the said aircraft controls in opposition to one another the forces caused by the rotation of said bob weights due to the normal acceleration of the said aircraft, and to apply to the said aircraft controls in cooperation with one another the forces caused by the rotation of said bob weights due to the pitch angular acceleration of the said aircraft, thereby providing to the said aircraft controls a first force cue proportional to the normal acceleration of said aircraft and a second force cue proportional to the pitch angular acceleration of said aircraft, a damping element connected to each said bob weight to prevent undue oscillation thereof, and to apply a third force cue to said aircraft controls proportional to the rate of deflection of the said longitudinal control element, and a spring torque-tube having a wind-up proportional to the displacement of said longitudinal control element to produce a fourth force cue proportional to said displacement, said spring torque-tube being additionally adapted to produce a fifth force cue proportional to $$\frac{q-q_t}{q_t}$$

where:

$q$ = the dynamic air pressure of the said aircraft, and
$q_t$ = the dynamic air pressure of the said aircraft at a preselected trim speed, by means of an arm having a curved cam groove attached to one end of said spring torque-tube, a pivot block fitted to slide within said cam groove, a first linear actuator element responsive to $q$ and attached to said arm to vary the position of the said cam groove relative to the said pivot block as a function of the value of $q$, and a second linear actuator element responsive to an input signal representative of the value of $q_t$ and attached to said pivot block to vary the position of said pivot block relative to the said cam groove as a function of the value of $q_t$, the said cam groove being contoured to transmit a force proportional to $$\frac{q-q_t}{q_t}$$

through said arm to said spring torque-tube, with a linkage system connecting said spring torque-tube to the said aircraft controls to apply said fourth force cue and said fifth force cue thereto, whereby the resultant of said first, second, third, fourth, and fifth force cues as applied to said aircraft controls, produces said synthetic "feel" force effectively indicative of aircraft behavior.

7. An aircraft control system in accordance with claim 6 in which the said spring system is adapted to be effectively rateless in normal flight.

8. In an aircraft control system a mechanical network for producing a first force cue proportional to the normal acceleration of an aircraft and a second force cue proportional to the pitch angular acceleration of an aircraft comprising, a pair of pivotally mounted bob weights of considerable mass positioned on opposite sides of an athwartship plane passing through the center of gravity of the said aircraft, and a spring system adapted to maintain each said bob weight in a substantially horizontal neutral position, whereby normal or pitch angular acceleration of the said aircraft causes spring-restrained rotation of each said bob weight, with a linkage system adapted to transmit in opposition to one another the forces caused by the rotation of said bob weights due to the normal acceleration of the said aircraft thereby mechanically producing a first force cue proportional to the normal acceleration of said aircraft, and to transmit in cooperation with one another the forces caused by the rotation of said bob weights due to the pitch angular acceleration of the said aircraft thereby mechanically producing a second force cue proportional to the pitch angular acceleration of said aircraft.

9. A mechanical network in accordance with claim 8 in which a damping element is connected to each said bob weight to prevent undue oscillation thereof.

10. A mechanical network in accordance with claim 8 in which the said spring system is adapted to be effectively rateless in normal flight.

11. In an aircraft control system utilizing a control stick, a mechanical network for delivering a force cue to said control stick proportional to $$\frac{q-q_t}{q_t}$$

where:

$q$ = the dynamic air pressure of an aircraft, and
$q_t$ = the dynamic air pressure of the said aircraft at a preselected trim speed, comprising, a spring torque-tube, an arm having a curved cam groove attached to one end of said spring torque-tube, a pivot block fitted to slide within said cam groove, a first linear actuator element responsive to $q$ and attached to said arm to vary the position of the said cam groove relative to the said pivot block as a function of the value of $q$, and a second linear actuator element responsive to an input signal representative of the value of $q_t$ and attached to said pivot block to vary the position of said pivot block relative to the said cam groove as a function of the value of $q_t$ at said preselected trim speed, said cam groove has a contour for transmitting a force proportional to $$\frac{q-q_t}{q_t}$$

through said arm to said spring torque-tube and said control stick.

12. In an aircraft control system a mechanical network for producing a force cue proportional to the change in speed of an aircraft from a preselected trim speed comprising, a centering spring, an electrical screw jack connected for indexing said centering spring in proportion to the value of an electrical input signal, an electrical trim control for producing an output signal proportional to a preselected trim speed, circuit means connecting the output signal of said trim control to the input of said screw jack to index the said centering spring in proportion to the said selected trim speed, an electrical sensing element adapted to produce an output signal proportional to the speed of the said aircraft, an electrical rate network for producing from an input signal quantity an output signal proportional to the rate of change of said quantity, circuit means connecting the output signal of said speed-sensing element to the input of said electrical rate network to produce at its output a signal proportional to the rate of change of the speed of said aircraft, and circuit means for connecting the output signal of said rate network to the input of said screw jack to reindex the position of the said centering spring in proportion to the rate of change of the speed of said aircraft.

References Cited in the file of this patent
UNITED STATES PATENTS

| | | |
|---|---|---|
| 2,487,793 | Esval et al. | Nov. 15, 1949 |
| 2,619,623 | Meredith | Nov. 25, 1952 |
| 2,626,767 | Bromley | Jan. 27, 1953 |
| 2,725,203 | Blatz et al. | Nov. 29, 1955 |
| 2,770,429 | Schuck et al. | Nov. 13, 1956 |
| 2,772,841 | Bonsteel | Dec. 4, 1956 |
| 2,797,882 | Servanty | July 2, 1957 |
| 2,809,603 | Bell | Oct. 15, 1957 |